United States Patent
Chakra et al.

(10) Patent No.: US 9,361,651 B2
(45) Date of Patent: Jun. 7, 2016

(54) DISPLAYING QUANTITATIVE TRENDING OF PEGGED DATA FROM CACHE

(71) Applicant: International Business Machines Corporation, Armonk, NY (US)

(72) Inventors: Al Chakra, Apex, NC (US); John A. Feller, Cary, NC (US); Trudy L. Hewitt, Cary, NC (US); Francesco C. Schembari, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 286 days.

(21) Appl. No.: 13/644,771

(22) Filed: Oct. 4, 2012

(65) Prior Publication Data

US 2014/0101607 A1    Apr. 10, 2014

(51) Int. Cl.
*G06F 3/048* (2013.01)
*G06Q 40/00* (2012.01)
*G06F 3/0482* (2013.01)

(52) U.S. Cl.
CPC ............... *G06Q 40/12* (2013.12); *G06F 3/048* (2013.01); *G06F 3/0482* (2013.01)

(58) Field of Classification Search
CPC ........ G06F 3/0482; G06F 3/048; G06Q 40/12
USPC .................................................. 715/810, 241
See application file for complete search history.

(56) References Cited

U.S. PATENT DOCUMENTS

| | | | |
|---|---|---|---|
| 6,219,818 B1 | 4/2001 | Freivald et al. | |
| 6,366,933 B1 | 4/2002 | Ball et al. | |
| 6,553,419 B1 | 4/2003 | Ram | |
| 6,763,388 B1 | 7/2004 | Tsimelzon | |
| 6,834,306 B1* | 12/2004 | Tsimelzon | ........ G06F 17/30905 707/E17.116 |
| 6,981,225 B1 | 12/2005 | Gaudette | |
| 7,152,203 B2 | 12/2006 | Gao et al. | |
| 7,386,802 B2 | 6/2008 | Gaudette | |
| 7,523,158 B1 | 4/2009 | Nickerson et al. | |
| 7,559,016 B1 | 7/2009 | Rakowski et al. | |
| 7,702,811 B2 | 4/2010 | Gopalan et al. | |
| 7,958,232 B1 | 6/2011 | Colton et al. | |
| 8,103,742 B1 | 1/2012 | Green | |

(Continued)

FOREIGN PATENT DOCUMENTS

WO    WO2012021780 A2 *  2/2012  ............. G06Q 30/00

OTHER PUBLICATIONS

Al Chakra et al,. "Displaying Quantitative Trending of Pegged Data from Cache", Specification and Drawings for U.S. Appl. No. 13/644,771, filed Oct. 4, 2014, 18 pages.

(Continued)

*Primary Examiner* — Jennifer To
*Assistant Examiner* — John Repsher, III
(74) *Attorney, Agent, or Firm* — Jordan IP Law, LLC

(57) ABSTRACT

Methods and systems of displaying response data provide for identifying a pegged area of display content during a first retrieval of the display content by a client device at a first moment in time. Additionally, first data associated with the pegged area may be stored, wherein a comparison can be conducted between the first data and additional data associated with the pegged area at one or more subsequent moments in time. In one example, a user interface is generated that highlights a quantitative trend of the pegged area between the first moment in time and the one or more subsequent moments in time.

10 Claims, 3 Drawing Sheets

(56) References Cited

U.S. PATENT DOCUMENTS

| | | | |
|---|---|---|---|
| 8,176,433 B2 | 5/2012 | Bauchot et al. | |
| 8,181,112 B2 | 5/2012 | Jolley et al. | |
| 8,185,621 B2* | 5/2012 | Kasha | 709/224 |
| 8,606,955 B1 | 12/2013 | Fernandes et al. | |
| 8,762,878 B1 | 6/2014 | Weber et al. | |
| 2002/0154173 A1* | 10/2002 | Etgen et al. | 345/833 |
| 2002/0194296 A1 | 12/2002 | Dutta et al. | |
| 2004/0044785 A1* | 3/2004 | Bell et al. | 709/238 |
| 2006/0259585 A1 | 11/2006 | Keohane et al. | |
| 2006/0274083 A1 | 12/2006 | Makela | |
| 2007/0214239 A1 | 9/2007 | Mechkov et al. | |
| 2007/0288589 A1 | 12/2007 | Chen et al. | |
| 2008/0059544 A1* | 3/2008 | Rahim | 707/204 |
| 2008/0104520 A1 | 5/2008 | Swenson et al. | |
| 2008/0200154 A1 | 8/2008 | Maharajh et al. | |
| 2008/0201452 A1 | 8/2008 | Athas et al. | |
| 2008/0307301 A1* | 12/2008 | Decker et al. | 715/241 |
| 2009/0070413 A1 | 3/2009 | Priyadarshan et al. | |
| 2010/0005053 A1* | 1/2010 | Estes | 707/1 |
| 2010/0077321 A1 | 3/2010 | Shen et al. | |
| 2010/0146400 A1 | 6/2010 | Tesler et al. | |
| 2010/0287462 A1* | 11/2010 | Hauser | 715/241 |
| 2010/0313252 A1 | 12/2010 | Trouw | |
| 2010/0318892 A1* | 12/2010 | Teevan et al. | 715/229 |
| 2011/0252160 A1 | 10/2011 | Wu | |
| 2011/0289392 A1* | 11/2011 | Naqvi | 715/205 |
| 2012/0220346 A1 | 8/2012 | Yu et al. | |
| 2012/0278697 A1 | 11/2012 | Yokoyama et al. | |
| 2013/0138477 A1* | 5/2013 | Wilkins et al. | 705/7.31 |
| 2013/0283150 A1* | 10/2013 | Chen et al. | 715/234 |
| 2013/0332816 A1 | 12/2013 | Al Chakra et al. | |

OTHER PUBLICATIONS

Non-Final Office Action for U.S. Appl. No. 14/59703, mailed Nov. 23, 2015, 41 pages, United States Patent & Trademark Office.
Non-Final Office Action for U.S. Appl. No. 13/492,133, mailed Dec. 2, 2014, 32 pages, United States Patent & Trademark Office.
Final Office Action for U.S. Appl. No. 13/492,133, mailed Mar. 26, 2015, 35 pages, United States Patent & Trademark Office.
Advisory Action for U.S. Appl. No. 13/492,133, mailed Jun. 18, 2015, 5 pages, United States Patent & Trademark Office.
Non-Final Office Action for U.S. Appl. No. 13/492,133, mailed Oct. 21, 2015, 14 pages, United States Patent & Trademark Office.
Sparkchess, Aug. 26, 2011, http://www.sparkchess.com, 6.0.0 online lite (sparkchess.pdf), 6 pages.
TheDizle, Mar. 29, 2012, p. 6, http://gametipcenter.com/mass-effect-3-cheats-unlocks-unlockables-endings-guides-more, (Mass Effect 3.pdf), 21 pages.

* cited by examiner

DISPLAYING QUANTITATIVE TRENDING OF PEGGED DATA FROM CACHE

BACKGROUND

Embodiments of the present invention generally relate to the presentation of digital content to users. More particularly, embodiments relate to the use of pegged display areas to present quantitative data trends to users.

Many websites may provide users with standardized account information in the form of current status summaries or monthly, quarterly or annual statements, wherein the displayed information is typically selected and structured the same way by the website provider for all users of the website. For example, the provider might determine the information to be provided in a given statement as well as the frequency with which the statement generated, regardless of the user's individual needs. Such a lack of customization can detract from the overall user experience. Moreover, it may be difficult for users to fully understand how the information has changed over time, particularly if the information of interest has not been identified for inclusion in the statement by the provider.

BRIEF SUMMARY

Embodiments may include a computer program product having a computer readable storage medium and computer usable code stored on the computer readable storage medium. If executed by a processor, the computer usable code may cause a computer to identify a pegged area of display content during a first retrieval of the display content by a client device at a first moment in time. The computer usable code, if executed, may also cause a computer to store first data associated with the pegged area and conduct a comparison between the first data and additional data associated with the pegged area at one or more subsequent moments in time.

Embodiments may also include a computer implemented method in which a user selection of a subset of a display area associated with display content is detected, wherein the user selection corresponds to one or more of a cursor hover action and a touch screen action during a first retrieval of the display content by a client device at first moment in time. The method can also provide for determining a height and width of a pegged area based on the user selection and storing first data associated with the pegged area. Additionally, a comparison may be conducted between the first data and additional data associated with the pegged area at one or more subsequent moments in time. The method can also involve generating a user interface that highlights a quantitative trend of the pegged area between the first moment in time and the one or more subsequent moments in time. In addition, the user interface may include a graphical representation of a plurality of attributes, a first version of the display content with the first data, and a second version of the display content with the additional data.

Embodiments may also include a computer program product having a computer readable storage medium and computer usable code stored on the computer readable storage medium. If executed by a processor, the computer usable code may cause a computer to detect a user selection of a subset of a display area associated with display content, wherein the user selection is to correspond to one or more of a cursor hover action and a touch screen action during a first retrieval of the display content by a client device at a first moment in time. The computer usable code can also cause a computer to determine a height and width of a pegged area based on the user selection, store first data associated with the pegged area, and conduct a comparison between the first data and additional data associated with the pegged area at one or more subsequent moments in time. Additionally, the computer usable code may cause a computer to generate a user interface that highlights a quantitative trend of the pegged area between the first moment in time and the one or more subsequent moments in time, includes a graphical representation of a plurality of attributes, and includes a first version of the display content with the first data and a second version of the display content with the additional data.

BRIEF DESCRIPTION OF THE SEVERAL VIEWS OF THE DRAWINGS

The various advantages of the embodiments of the present invention will become apparent to one skilled in the art by reading the following specification and appended claims, and by referencing the following drawings, in which:

DETAILED DESCRIPTION

Figure 1:
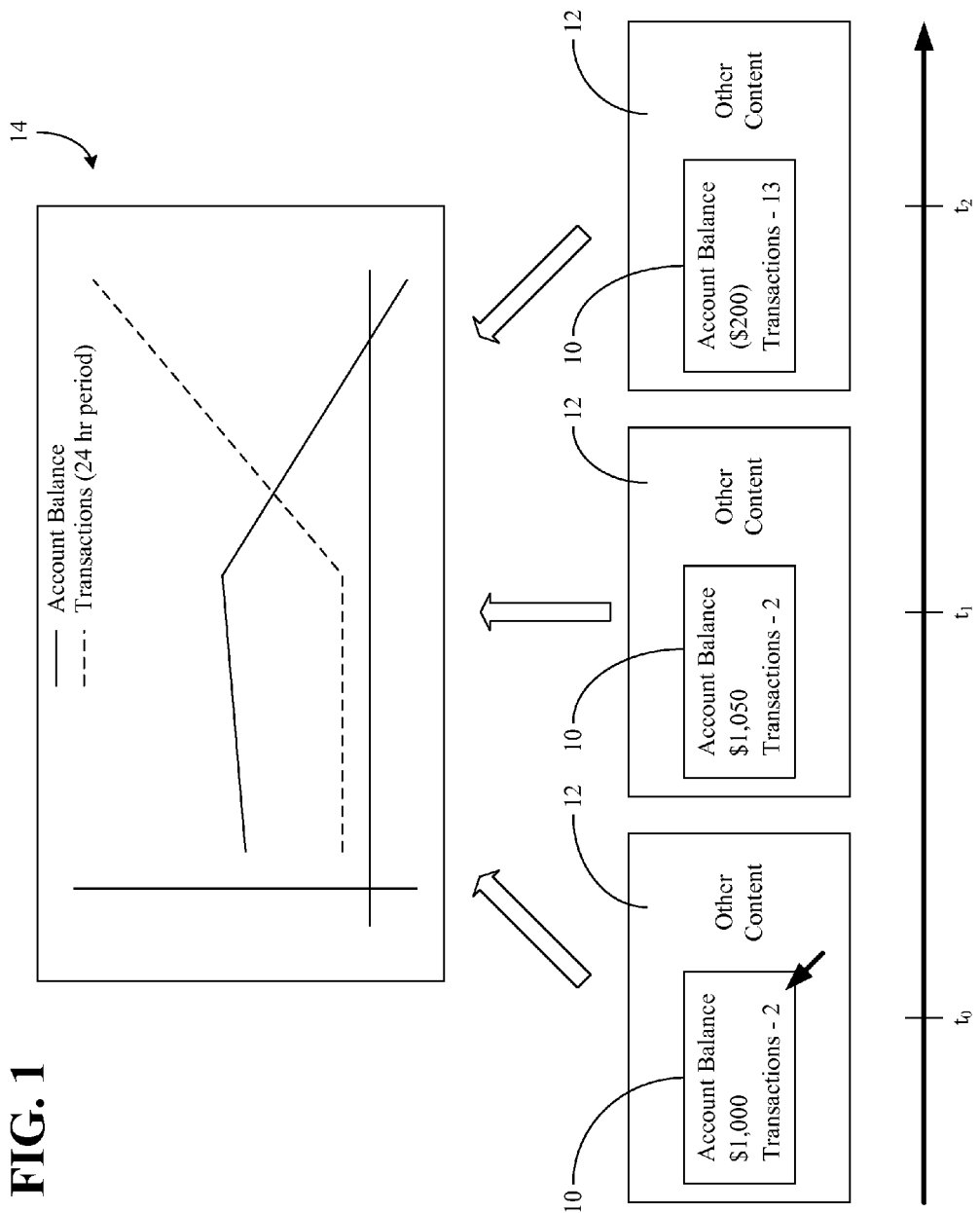
FIG. 1 is timeline of an example of a trend determination according to an embodiment.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Referring now to FIG. 1, a timeline is shown in which a trend is determined for data corresponding to a user-pegged area 10. More particularly, an overall display area 12 may be presented to a user at time $t_0$ in response to a retrieval of display content such as a web page, word processing document, spreadsheet, email message, instant message (IM), desktop interface, file folder window, and so forth, wherein the user may identify the pegged area 10 by conducting a cursor hover action, touch screen action, or other suitable action over and/or near data (e.g., "Account Balance $1,000", "Transactions—2") of interest to the user. As will be discussed in greater detail, the attributes/data within the pegged area 10 may be identified based on, for example, a document object model (DOM) associated with the display content and/or metadata specifically associated with the pegged area 10. Of particular note is that the pegged area 10 is selected by the user rather than the provider of the display content, in the illustrated example. Moreover, the pegged area 10 may be selected while the display content is being retrieved from the appropriate source (e.g., web server, hard disk drive, flash memory, etc.). Accordingly, while the provider of the display content might focus on other content in the overall display area 12 for the generation of summaries and/or statements, the illustrated approach enables the user to override the focus of those summaries/statements and therefore achieve a high level of customization.

A particularly advantageous aspect of the illustrated solution is that trends in the data within the pegged area 10 may be automatically identified over time and presented to the user. For example, if at a later (e.g., subsequent) moment in time $t_1$ the user retrieves the display content again (or the user schedules an automated analysis at time $t_1$ via a frequency setting), the data within the pegged area 10 (e.g., "Account Balance $1,050", "Transactions—2") can be identified and automatically compared to the data within the pegged area 10 at time $t_0$. Similarly, if at an even later moment in time $t_2$ the user retrieves and/or schedules the display content 12 for analysis, the data within the pegged area 10 (e.g., "Account Balance ($200)", "Transactions—13") may be identified and automatically compared to the data within the pegged area at times $t_0$ and $t_1$.

Indeed, a graphical representation 14 of the plurality of attributes (e.g., account balance, number of transactions) may even be generated based on the historical comparison. Of particular note is that the amount of time between the instances $t_0$, $t_1$ and $t_2$ may be determined entirely by the user and could be of no significance to anyone other than the user. Thus, the analysis frequency may be difficult to determine and/or administer on the part of the provider of the display content 12. For example, the comparisons might be conducted every Thursday of the week, whenever the user goes shopping, each year on the user's birthday, and so forth. Additionally, the attributes to be represented may be selected and/or configured by the user. For example, the user may choose to exclude particular attributes from the pegged area 10 after designating the pegged area 10.

Figure 2:
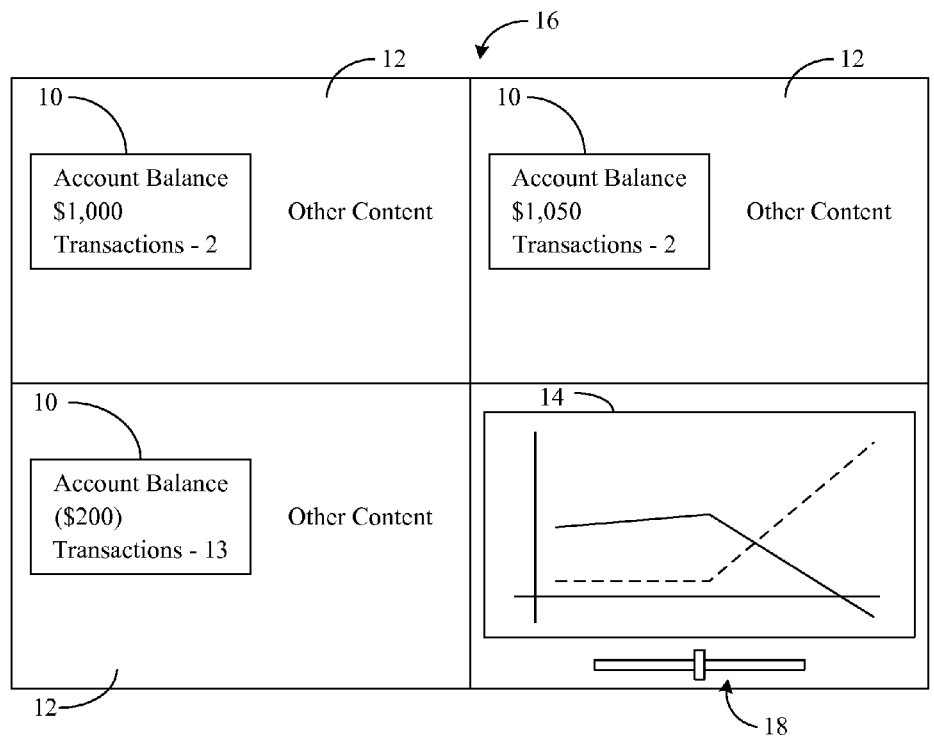
FIG. 2 is an illustration of an example of a user interface according to an embodiment.

FIG. 2 shows a user interface (UI) 16 that may be generated and presented to the user. The UI 16 might be presented whenever the user retrieves the display content (e.g., at times $t_0$, $t_1$, $t_2$ ..., FIG. 1) and/or according to a user schedule/frequency setting (e.g., in a reporting email, text message, IM). The UI 16 may generally highlight a quantitative trend of the pegged area 10 between moments in time. In the illustrated example, the UI 16 includes the graphical representation 14, as well as a version of the display content 10 at the different moments in time reflected in the graphical representation 14. The UI 16 may also include a control mechanism 18 (e.g., slider bar) that enables the user to view the data in relatively large amounts and/or over relatively long periods of time. Thus, the user is able to view past trends as well as more current trends with a simple and easy to user interface, in the example shown.

Figure 3:
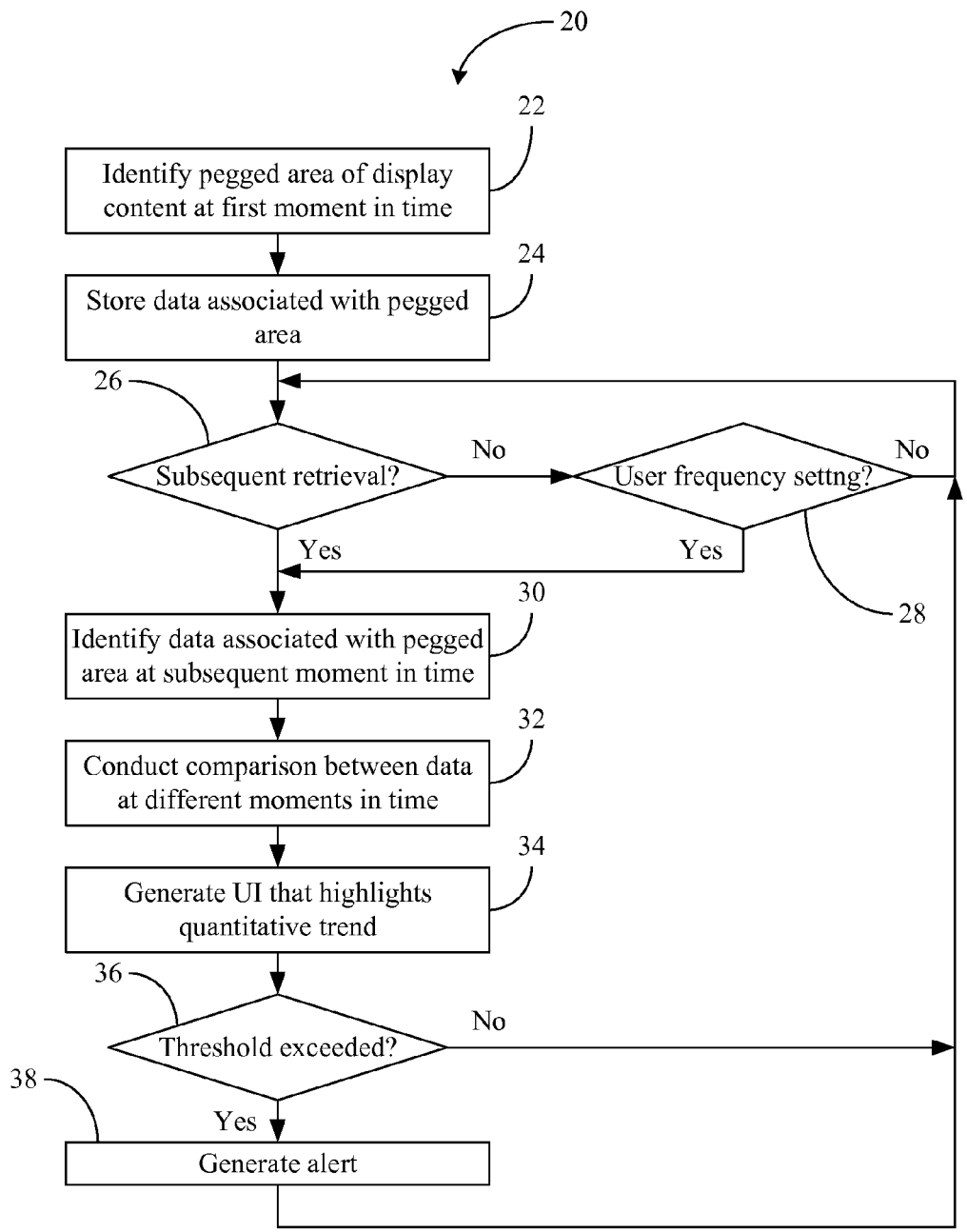
FIG. 3 is a flowchart of an example of a method of determining a trend in data corresponding to a pegged area according to an embodiment.

Turning now to FIG. 3, a method 20 of determining a trend in data corresponding to a pegged area is shown. The method 20 may be implemented in a client device such as, for example, a desktop computer, notebook computer, handheld device, etc., on a server (e.g., cloud computing server, web server), or any combination thereof. In the illustrated example, a pegged area of display content is identified at a first moment in time at block 22 (e.g., during a retrieval of the display content). The pegged area may be identified, for example, in response to detecting a user selection of a subset of a display area associated with the display content, wherein the user selection might correspond to a cursor hover action, a touch screen action, and so forth. Moreover, a height and width of the pegged area may be determined based on the user selection. For example, the cursor hover action might be used to analyze the display content and structure the pegged area to include any quantitative information within a certain distance of the coordinates of the cursor. Alternatively, the user selection might be a touch of two corners of the pegged area, wherein a rectangle can be constructed based on the indicated corners.

Illustrated block 24 identifies data associated with the pegged area and stores the data in a local cache of the client device and/or a remote location (e.g., at the server). The stored data may include, for example, amounts (e.g., account balances), dates, and/or other quantitative information that may compared over time. As already noted, the data may include multiple attributes that are user defined/configurable. In one example, the data is identified based on metadata associated with the pegged area. Additionally, the data may be identified by reading a document object model (DOM) associated the display content (e.g., web page), and fetching data allocated to the pegged area in the DOM. A determination may be made at block 26 as to whether a subsequent retrieval of the display content by the client device has occurred, wherein the determination might involve identifying an Internet protocol (IP) address, a media access control (MAC) address, cookie information, login information, etc., associated with the client device. If not, illustrated block 28 determines whether a user frequency setting calls for an automatic analysis of the display content. An affirmative determination at either block 26 or block 28 can cause an identification at block 30 of additional data associated with the pegged area at the subsequent moment in time, wherein a comparison may be conducted at block 32 between the additional data in the pegged area at the current moment in time and data in the pegged area at one or more earlier moments in time. As already noted, the comparison may be between a plurality of attributes reflected in the data.

Block 34 may provide for generating a user interface that highlights a quantitative trend of the pegged area between multiple moments in time (e.g., between a first moment in time and a second moment in time). As already noted, the user interface may include a graphical representation and/or a control mechanism, as well as multiple versions of the pegged area over time. Additionally, a determination may be made at block 36 as to whether a threshold has been exceeded, wherein the threshold can be a user defined threshold related to the data that is being tracked. For example, a zero balance threshold, a rate of change threshold (e.g., >$1,000 reduction per day), and so forth, may be defined by the user. If the threshold is exceeded, illustrated block 38 may generate a user alert based on the comparison. The alert may be presented to the user via a user interface such as the UI 16 (FIG. 2) and/or an appropriate messaging solution (e.g., email, text message, IM). The determination at block 26 may be repeated for multiple moments in time.

Figure 4:
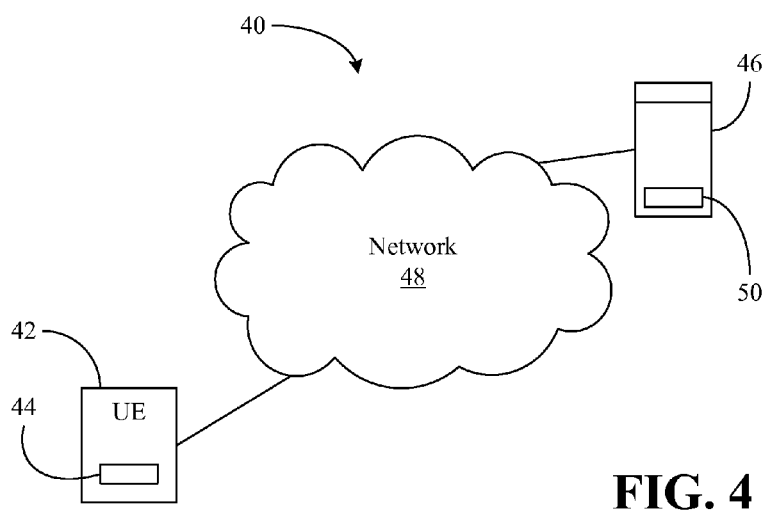
FIG. 4 is a block diagram of a networking architecture according to an embodiment.

FIG. 4 shows a networking architecture 40 in which a user equipment (UE) device 42 (e.g., client device) is configured to initiate a retrieval of display content including one or more web pages from a server 46 via a network 48 in response to user requests. In the illustrated example, the server 46 can have stored thereon hypertext markup language (HTML) and other markup language-encoded content, as well as databases and applications such as Java and other applications. The network 48 can itself include any suitable combination of servers, access points, routers, base stations, mobile switching centers, public switching telephone network (PSTN) components, etc., to facilitate communication between the UE device 42 and the server 46. The UE equipment 42 may also obtain display content locally from mass storage, flash memory, and so forth.

In one example, the UE device 42 includes a trend module 44 configured to identify pegged areas of display content during retrievals of the display content by the UE device 42 and store data associated with the pegged areas locally at the UE device 42 and/or remotely at the server 46. Additionally, the trend module 44 may conduct comparisons between the stored data and data associated with the pegged areas at subsequent moments in time. The trend module 44 can also generate user interfaces that highlight quantitative trends of the pegged areas between moments in time. The server 50 may also include a trend module 50 configured to perform one or more of the functions of the trend module 44 of the UE device 42.

Thus, techniques described herein may peg a selected area of a screen/program (e.g., operating system, web browser, mobile device), based on where a user hovers and/or touches. Additionally, metatags of the area where the user has hovered may be used to determine a height and width (e.g., measured in pixels) of a pegged area. Alternatively, the DOM may be parsed in order to identify one or more tags of the pegged area. Moreover, a static representation of the pegged area can be stored in device cache and/or on a web server, wherein on subsequent visits, the user may be provided with the most current version of the pegged content along with prior cached versions for comparative purposes. Furthermore, a processor can identify the type of data and formulate any trends from the pegged area into a useful graph, chart, or user preferred presentation. Accordingly, client-side and server-side attributes may be leveraged to identify areas having query data.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions. In addition, the terms "first", "second", etc. may be used herein only to facilitate discussion, and carry no particular temporal or chronological significance unless otherwise indicated.

Those skilled in the art will appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

We claim:

1. A computer implemented method comprising:

detecting a user selection of a subset of a display area associated with display content, wherein the user selection corresponds to one or more of a cursor hover action and a touch screen action during a first retrieval of the display content by a client device at a first moment in time;

determining a height and width of a pegged area based on the user selection;

excluding data relating to the pegged area that corresponds to particular user selected attributes selected for exclusion by the user, wherein the data is excluded without excluding a displayed graphical element, and wherein excluding the data blocks an initial appearance of the data;

storing first data associated with the pegged area, wherein the first data does not include excluded data;

conducting a comparison between the first data and additional data associated with the pegged area at one or more subsequent moments in time;

generating a user interface that highlights a quantitative trend of the pegged area between the first moment in time and the one or more subsequent moments in time, and includes a graphical representation of a plurality of attributes, a control mechanism that enables the user to selectively vary the amount of data on view and the period of time that the data covers, a first version of the display content with the first data and a second version of the display content with the additional data;

identifying the first data and the additional data based on metadata associated with the pegged area;

reading a document object model (DOM) associated with the display content;

fetching data allocated to the pegged area in the DOM to identify the first data and the additional data; and generating an alert based on the comparison, wherein the comparison is conducted in response to one or more of a subsequent retrieval of the display content by the client device and a user frequency setting.

2. A computer program product comprising:

a non-transitory computer readable storage medium; and computer usable code stored on the non-transitory computer readable storage medium, wherein if executed by a processor, the computer usable code causes a computer to:

detect a user selection of a subset of a display area associated with display content, wherein the user selection is to correspond to one or more of a cursor hover action and a touch screen action during a first retrieval of the display content by a client device at a first moment in time;

determine a height and width of a pegged area based on the user selection;

exclude data relating to the pegged area that corresponds to particular user selected attributes selected for exclusion by the user, wherein the data is excluded without excluding a displayed graphical element, and wherein excluding the data blocks an initial appearance of the data;

store first data associated with the pegged area, wherein the first data does not include excluded data;

conduct a comparison between the first data and additional data associated with the pegged area at one or more subsequent moments in time;

generate a user interface that highlights a quantitative trend of the pegged area between the first moment in time and the one or more subsequent moments in time, and includes a graphical representation of a plurality of attributes, a control mechanism that enables the user to selectively vary the amount of data on view and the period of time that the data covers, a first version of the display content with the first data and a second version of the display content with the additional data;

identify the first data and the additional data based on metadata associated with the pegged area;

read a document object model (DOM) associated with the display content;

fetch data allocated to the pegged area in the DOM to identify the first data and the additional data; and generate an alert based on the comparison, wherein the comparison is conducted in response to one or more of a subsequent retrieval of the display content by the client device and a user frequency setting.

3. A system comprising:

at least one processor;

a non-transitory computer readable storage medium; and computer usable code stored on the non-transitory computer readable storage medium, wherein if executed by the at least one processor, the computer usable code causes the at least one processor to;

detect a user selection of a subset of a display area associated with display content, wherein the user selection is to correspond to one or more of a cursor hover action and a touch screen action during a first retrieval of the display content by a client device at a first moment in time;

determine a height and width of a pegged area based on the user selection;

exclude data relating to the pegged area that corresponds to particular user selected attributes selected for exclusion by the user, wherein the data is excluded without excluding a displayed graphical element, and wherein excluding the data blocks an initial appearance of the data;

store first data associated with the pegged area, wherein the first data does not include excluded data;

conduct a comparison between the first data and additional data associated with the pegged area at one or more subsequent moments in time;

generate a user interface that highlights a quantitative trend of the pegged area between the first moment in time and the one or more subsequent moments in time, and includes a graphical representation of a plurality of attributes, a control mechanism that enables the user to selectively vary the amount of data on view and/or the period of time that the data covers, a first version of the display content with the first data and a second version of the display content with the additional data;

identify the first data and the additional data based on metadata associated with the pegged area;

read a document object model (DOM) associated with the display content;

fetch data allocated to the pegged area in the DOM to identify the first data and the additional data; and generate an alert based on the comparison, wherein the comparison is conducted in response to one or more of a subsequent retrieval of the display content by the client device and a user frequency setting.

4. The system of claim 3, wherein the control mechanism is a slider.

5. The system of claim 3, wherein the computer usable code, if executed, causes the at least one processor to generate a user interface that includes one or more subsequent versions of the display content with the additional data.

6. The system of claim 3, wherein client-side and server-side attributes are used to identify areas having query data.

7. The method of claim 1, wherein the control mechanism is a slider.

8. The method of claim 1, wherein client-side and server-side attributes are used to identify areas having query data.

9. The computer program product of claim 2, wherein the control mechanism is a slider.

10. The computer program product of claim 2, wherein client-side and server-side attributes are used to identify areas having query data.

* * * * *